Jan. 27, 1925. 1,524,261
F. KUSTERLE
CONNECTION FOR TUBES
Filed Oct. 16, 1919
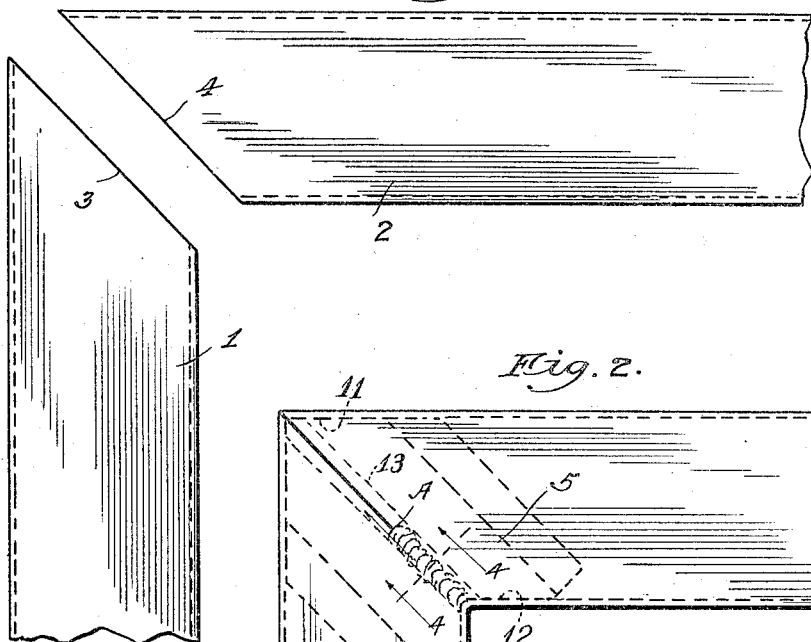
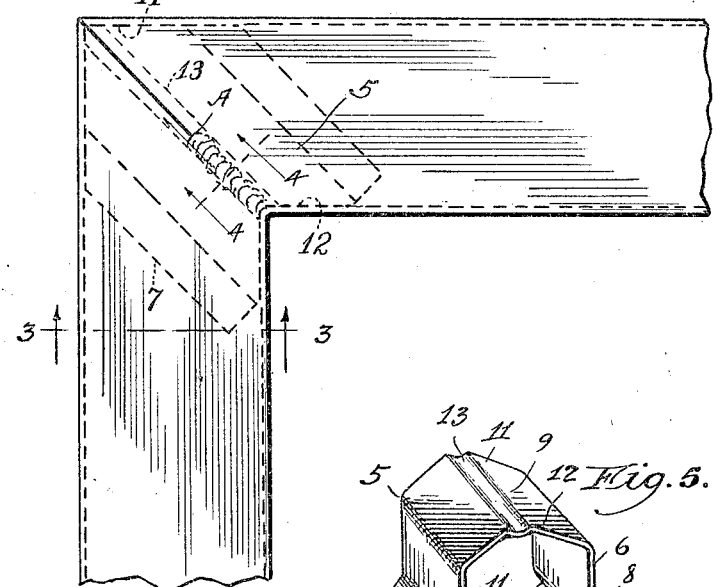
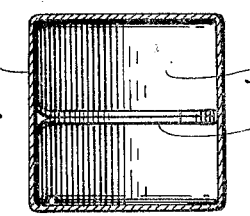
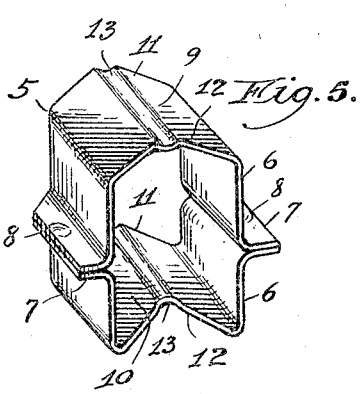
Witnesses,
Inventor,
Frank Kusterle.

Patented Jan. 27, 1925.

1,524,261

UNITED STATES PATENT OFFICE.

FRANK KUSTERLE, OF KENOSHA, WISCONSIN, ASSIGNOR TO SIMMONS COMPANY, OF KENOSHA, WISCONSIN, A CORPORATION OF DELAWARE.

CONNECTION FOR TUBES.

Application filed October 16, 1919. Serial No. 330,968.

*To all whom it may concern:*

Be it known that I, FRANK KUSTERLE, a citizen of the United States, residing at Kenosha, in the county of Kenosha and State of Wisconsin, have invented certain new and useful Improvements in Connections for Tubes.

My invention has reference more particularly to the joining of light-weight tubes or sheet metal parts by means of a welded or fused metal joint and is particularly useful in, although not limited to, the construction of metal furniture such as metal beds, wherein light-weight tubing is employed, for affording a substantial welded or fused connection between sections of such tubes.

In constructing certain articles, such as metal beds, it is desirable to use thin walled tubing or material, for the sake of economy and to minimize weight, and it is also desirable to permanently unite sections of such tubing or material by a welded or similar fused metal joint. Heretofore it has been found difficult to effect such connection, owing to the thin character of the wall, which permits the metal at the point of fusion to readily melt or burn away, leaving imperfections in the finished joint. With my invention, the tendency of the metal at the joint to melt or burn away during the operation of welding is not ony avoided so that a perfect joint results, but the proper placing and welding together of the sections to be welded, preparatory to and during welding, is facilitated and substantial reinforcement of the finished joint afforded.

The principal objects, therefore, of my invention, are to provide a method and means for welding or fusing together thin-walled tubing or other parts whereby the tendency of the material to melt or burn away at the joint is obviated; to provide a backing underlying the edges of the parts to be connected, so as to hold and retain the fused metal at the joint; to facilitate the placing and holding together of the parts to be welded together preparatory to and during the operation of welding; to afford reinforcing for the welded joint; and in general to provide an improved method and improved means whereby thin-walled tubing or other parts may be welded or fused together easily and economically without the difficulties and imperfections heretofore experienced and resulting from the previously known methods of welding same, and wherein a more secure and substantial joint is effected.

On the drawings, Fig. 1, is a side view of two sections of tubing, having their ends cut on a 45° angle, preparatory to being joined together at right angles to one another; Fig. 2, a side view of the two sections of tubing shown in Fig. 1 joined together in accordance with my invention; Fig. 3, a sectional view on the line 3—3 of Fig. 2; Fig. 4 a fragmentary section of the welded joint on the line 4—4 of Fig. 2; and Fig. 5, a perspective view of the shell or filler which I employ for fitting and welding the tube sections together.

On the drawings the reference numerals 1 and 2 indicate two fragmentary pieces of light rectangular tubing, such for example as is used in making bed frames or ends, each of which said pieces of tubing has an end cut at a 45° angle as indicated at 3 and 4 respectively, so that the ends of the tubes may be joined together with the tubes at right angles to one another.

For the purpose of affording a backing for the edges of the tubes at the line of juncture, I employ a corner filler indicated as a whole at 5, which in addition to this primary purpose of enabling the edges to be welded or fused together without loss or displacement of metal at the point of fusion with the resulting imperfection in the joint, also serves to enable the ends of the tubes to be readily placed and held in the proper relative positions for welding and also reinforces the finished joint. This corner filler may be made in various forms, a convenient and inexpensive structure being shown, which comprises a shell structure of two similar half sections 6, of U-shaped cross section and having flanges 7 at their edges; the corresponding flanges of the two sections being secured together by a spot weld 8 or in any other suitable manner, with the half sections in opposed relation as shown. The opposite walls 9 and 10 of the shell are correspondingly formed, each being reversely cut at the ends, to provide projections 11 at one end of the shell, having oppositely inclined edges arranged at a 90° angle, and to provide notches 12 at the other end with oppositely inclined edges, likewise arranged at a 90° angle, so that the two side portions of the shell afford end fillers or inserts fitting somewhat closely into the ends of the tubes 1 and 2 respectively and said tubes telescope thereon, as shown in Fig. 2 in right angular relation with the edges to be united, butting together in proper position to afford a smooth joint. The outer faces of the walls 10 and 11 of the shell 5 are each provided with a cavity or groove 13 which underlies the meeting edges 3 and 4 of the tubes 1 and 2 when inserted on the shell or filler, and affords a pocket to support and receive the fused metal, as the edges of the tubes 1 and 2 are welded together, so as to prevent loss or displacement of the metal and form an internal bead which serves to effect a substantial connection between the edges of the tubes.

In uniting the tubes 1 and 2, the ends thereof are first cut so that the edges 3 and 4 respectively will butt together when the tubes are placed in the desired angular relation in which they are to be joined. The ends of the tubes are then inserted respectively on the opposite angularly related side portions of the shell 5 and held thereon with the edges 3 and 4 butted together, in which position the channels or grooves 13 register with the meeting edges 3 and 4 of the tubes. The structure is then placed so that the edges to be welded are above the respective channel 13, and a welding flame or any other welding means, for example, a welding electrode, applied above the edges 3 and 4. A strip or wire of fusible material is usually applied with the flame to afford extra material to combine with the edges of the two pieces being joined and insure a substantial connection. The welding flame or means is gradually advanced along the juncture of the two edges 3 and 4, the point at which it is acting being indicated at A in Fig. 2 and the direction of its progress being indicated by the arrow. Heretofore the fused metal at the point of operation was unsupported except by its cohesion with the adjacent material of the tubes, and owing to the thin character of the walls, oftentimes "let loose" and dropped away from the joint, leaving insufficient metal at that particular point and resulting in irregularity and imperfections in the finished joint, which after welding, had to be corrected. With my invention, however, this difficulty is overcome, as the groove 13 supports the fused metal and the latter, as the flame or other welding means advances along the juncture of the edges 3 and 4, forms a gradually advancing "puddle" in the groove 13, which latter serves somewhat as a mold, and the edges are consolidated into a unit with an internal bead 14, on the groove 13 along the line of juncture.

The filler or shell 5, of course, remains in position after the joint is completed and provides reinforcement for the connected parts, which, combined with the substantial character of the welded connection, insures an exceedingly strong structure.

I have shown the tubes 1 and 2 which are joined together of square or rectangular cross section and the filler or shell 5 correspondingly constructed to fit inside these tubes. It is to be understood, however, that the tubes of other cross sectional form may be joined together in the same manner, the filler 5 being constructed to correspond with the cross sectional form of the tubes. Furthermore, the shell or corner filler 5 as shown, made up of the two half sections 6, is merely a convenient form of construction and this filler may be otherwise made as for example by cutting sections of tubing with the proper angular ends to effect the required joint.

While I have shown and described my invention in a certain practical form, it will be understood from the foregoing that I contemplate various changes and modifications, and I therefore do not propose limiting the patent granted hereon otherwise than necessitated by the prior art.

I claim as my invention:

1. In a structure of the class described, the combination of a pair of angularly disposed initially unconnected tubes, a corner fitting having two side portions with an intermediate channel, said side portions being formed to fit snugly into the adjoining ends of the tubes so as to position the ends of the tubes in the same plane while preventing lateral movement of the tube-ends in said plane, with their adjoining end edges over the channel of the corner fitting, and a fused metal joint formed in the channel of the fitting and consolidating the adjoining ends of the tubes.

2. In a structure of the class described, the combination of a tubular shell notched at one end and pointed at the other end to afford angular portions at opposite sides thereof, a channel in the shell at the intersection of the two angular portions, a pair of tubular members having the ends telescoped over the angular portions of the shell, so that the edges thereof project over the channel in the shell, and a fused metal connection formed in the channel of the shell and consolidating the adjoining ends of the tubes.

3. In a structure of the class described, the combination of reversely arranged stampings connected together and forming a corner fitting of angular form having a channel in the outer face thereof at the juncture of the angular portions of the fitting, a pair of tubular members having the adjoining ends telescoped over the corner fitting and overlying the channel in the outer face thereof, and a fused metal bead formed in the channel so as to consolidate and join together the tubular members.

FRANK KUSTERLE.